United States Patent
Soennichsen et al.

(10) Patent No.: US 8,402,176 B2
(45) Date of Patent: Mar. 19, 2013

(54) SYSTEMS AND METHODS FOR AUTOMATIC CONFIGURATION PARAMETER MONITORING BETWEEN ACTUAL AND NOMINAL PARAMETER SETS FOR WIND ENERGY INSTALLATIONS

(75) Inventors: Bjoern Soennichsen, Rendsburg (DE); Sven Peters, Rendsburg (DE)

(73) Assignee: REpower Systems AG, Hamburg (DE)

( * ) Notice: Subject to any disclaimer, the term of this patent is extended or adjusted under 35 U.S.C. 154(b) by 0 days.

(21) Appl. No.: 12/855,403

(22) Filed: Aug. 12, 2010

(65) Prior Publication Data

US 2011/0047300 A1 Feb. 24, 2011

(30) Foreign Application Priority Data

Aug. 12, 2009 (DE) .................. 10 2009 037 237

(51) Int. Cl.
*H02P 9/04* (2006.01)
*G06F 3/00* (2006.01)
*G06F 19/00* (2006.01)

(52) U.S. Cl. ............... 710/16; 710/17; 710/18; 710/19; 702/183; 702/188; 290/44; 290/55

(58) Field of Classification Search .............. 710/16–19; 702/183, 188; 290/44, 55
See application file for complete search history.

(56) References Cited

U.S. PATENT DOCUMENTS

| | | | |
|---|---|---|---|
| 5,579,511 A | 11/1996 | Cavasa et al. | |
| 7,275,016 B2 * | 9/2007 | Gross et al. | 702/182 |
| 7,720,639 B2 * | 5/2010 | Kirchner et al. | 702/183 |
| 7,763,989 B2 * | 7/2010 | Kinzie et al. | 290/44 |
| 7,895,016 B2 * | 2/2011 | Vittal et al. | 702/184 |
| 7,948,103 B2 * | 5/2011 | Mixter, Jr. | 290/44 |
| 8,082,115 B2 * | 12/2011 | Bechhoefer et al. | 702/34 |
| 8,162,788 B2 * | 4/2012 | Hatch et al. | 475/62 |
| 8,174,136 B2 * | 5/2012 | Johnson et al. | 290/44 |
| 2004/0230377 A1 * | 11/2004 | Ghosh et al. | 702/3 |
| 2005/0090937 A1 | 4/2005 | Moore et al. | |
| 2009/0299697 A1 * | 12/2009 | Hamby et al. | 702/182 |
| 2011/0054825 A1 * | 3/2011 | Perla et al. | 702/113 |

FOREIGN PATENT DOCUMENTS

| | | |
|---|---|---|
| DE | 102 22 296 | 12/2003 |
| DE | 102 22 297 | 12/2003 |
| DE | 102 03 775 | 1/2004 |
| EP | 2 141 359 | 1/2010 |

OTHER PUBLICATIONS

A. S. Zaher and S.D.J. McArthur; A Multi-Agent Fault Detection System for Wind Turbine Defect Recognition and Diagnosis; Power Tech, 2007 IEEE; pp. 22-27.*

* cited by examiner

*Primary Examiner* — Tammara Peyton
(74) *Attorney, Agent, or Firm* — Morrison & Foerster LLP

(57) ABSTRACT

A method for automatic configuration parameter monitoring for wind energy installations. The method includes generating a nominal configuration parameter set for a wind energy installation, storing the nominal configuration parameter set in a database, automatically detecting an actual configuration parameter set for the wind energy installation, automatically comparing the nominal configuration parameter set with the actual configuration parameter set, and outputting a warning message in the event of discrepancies between the actual configuration parameter set and the nominal configuration parameter set. A system for implementing the method can include a wind energy installation with a communication unit, a server, and a database.

12 Claims, 1 Drawing Sheet

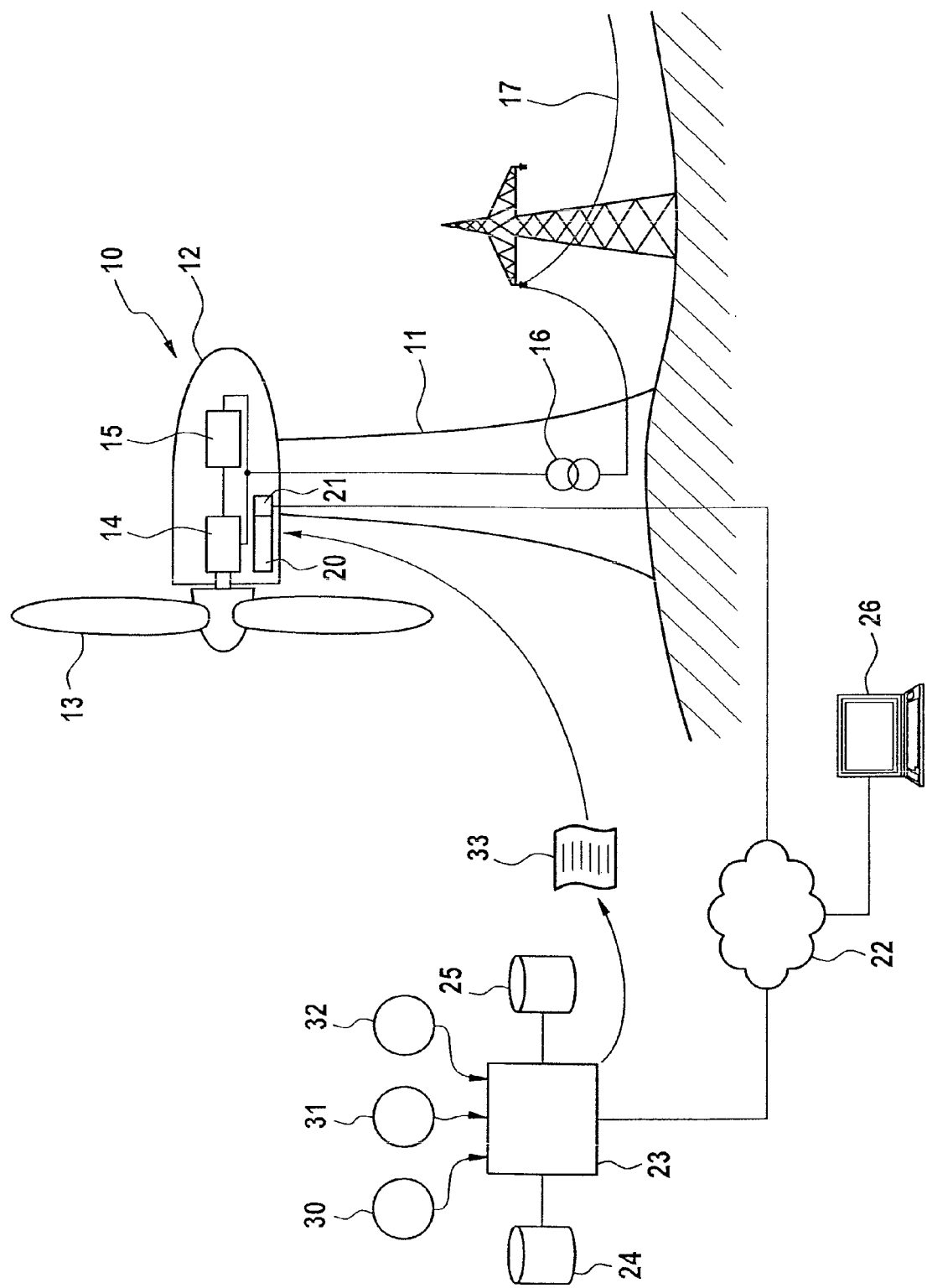

SYSTEMS AND METHODS FOR AUTOMATIC CONFIGURATION PARAMETER MONITORING BETWEEN ACTUAL AND NOMINAL PARAMETER SETS FOR WIND ENERGY INSTALLATIONS

REFERENCE TO RELATED APPLICATIONS

This application claims the priority of German Patent Application No. 10 2009 037 237.7, filed Aug. 12, 2009, the contents of which are incorporated herein by reference.

FIELD OF THE INVENTION

The invention relates to a method for automatic configuration parameter monitoring for wind energy installations. The invention furthermore relates to an arrangement for carrying out the method according to the invention.

BACKGROUND OF THE INVENTION

When installing wind energy installations, configuration parameters are programmed into the installation control system of a wind energy installation, which configuration parameters are used to control the wind energy installation and reflect settings and characteristics of the wind energy installation and of its components. Appropriate configuration parameters make it possible to operate the wind energy installation in its optimum operating state, that is to say with the maximum efficiency. All the configuration parameters for a wind energy installation can be combined to form a configuration parameter set. The configuration parameter sets of individual wind energy installations generally differ from one another.

In the prior art, it is known that, when installing a wind energy installation, the configuration parameter set is entered manually in the installation control system for the wind energy installation. During operation of the wind energy installation, the stored configuration parameter set is checked manually by a servicing technician, and is corrected if errors are found. Manual configuration parameter monitoring is highly time-consuming and is extremely susceptible to errors when there are a multiplicity of configuration parameters in the configuration parameter set. Because of the time involved, when there are a multiplicity of wind energy installations to be monitored, the checking intervals for the individual wind energy installations are frequently quite long, as a result of which incorrect settings of a wind energy installation may possibly be identified only at a late stage, with the wind energy installation being operated sub-optimally, as a result of which it is even possible for damage to occur to the wind energy installation.

SUMMARY OF THE INVENTION

The invention is based on the object of providing a method and an arrangement for configuration parameter monitoring for wind energy installations, which method and arrangement do not have the disadvantages of the prior art, or have them only to a lesser extent.

This object is achieved by the features broadly disclosed herein. Advantageous developments are described in the detailed disclosure.

According to the main claim, the invention relates to a method for automatic configuration parameter monitoring for wind energy installations, comprising the following steps:

a) generation of a nominal configuration parameter set for a wind energy installation;

b) storage of the nominal configuration parameter set in a database;

c) automated detection of an actual configuration parameter set for the wind energy installation;

d) automated comparison of the nominal configuration parameter set with the actual configuration parameter set; and e) output of a warning message in the event of discrepancies between the actual configuration parameter set and the nominal configuration parameter set.

According to the other independent method claim, the invention furthermore relates to a method for generating a nominal configuration parameter set for the installation control system for a wind energy installation, comprising the following steps:

a) check of the type of wind energy installation and of the components installed in the wind energy installation, and options that are provided;

b) automated obtaining of default parameters for the type of wind energy installation, component parameters for the components installed in the wind energy installation and option parameters for the options provided in the wind energy installation, from a database; and c) automated combination of the default parameters, component parameters and option parameters to form a nominal configuration parameter set.

The invention furthermore relates to an arrangement for automatic configuration parameter monitoring for wind energy installations comprising a server and at least one wind energy installation having a communication unit, wherein the communication unit is designed to obtain actual configuration parameters for the wind energy installation as an actual configuration parameter set, a nominal configuration parameter set for the wind energy installation is stored in a database associated with the server, and the server, the communication unit and/or the installation control system is designed to compare the actual configuration parameter set with the nominal configuration parameter set, and to output a warning message in the event of discrepancies between the actual configuration parameter set and the nominal configuration parameter set.

The "configuration parameters for the wind energy installation" are adjustable values which are taken into account by the installation control system for controlling a wind energy installation, and which describe both the mechanical configuration and the functional scope of the control system. Furthermore, "configuration parameters of the wind energy installation" is intended to mean the group of adjustable variables of the wind energy installation, which describes the characteristics of the wind energy installation in the control system. This can relate both to numerical values (such as the indication of the height of the tower of the wind energy installation, in order to determine critical natural frequencies and to make it possible to avoid them during operation) and/or digital details, which describe the presence or lack of specific assemblies (for example extra-long rotor blades for locations where the wind strength is weak) or functions (for example a specific "low-noise operating mode"). In general terms, the configuration parameters describe the equipment of the wind energy installation, in coded form. The individual configuration parameters are expediently matched to one another such that the wind energy installation operates close to its optimum operating state, that is to say with the maximum efficiency. In this context, configuration parameters does not mean variables which are used as dynamically changing variables in the course of control processes, such as a reference variable, controlled variable or disturbance variable during closed-loop control operation.

The "nominal configuration parameters" are those configuration parameters with which the wind energy installation is intended to operate in order to ensure reliable, disturbance-free operation. The "actual configuration parameters" are the configuration parameters with which the wind energy installation is actually operated. The actual configuration parameters are generally constant, and are changed only externally by the manufacturer or maintenance concerns (for example in the event of changes in the equipment or the activated functions of the wind energy installation). However, it is not intended to completely preclude the possibility of the configuration parameters possibly being changed themselves by the installation control system, for example if a coding error is identified by means of plausibility algorithms; this is then a self-adjusting installation control system.

Discrepancies between actual configuration parameters and nominal configuration parameters lead to the wind energy installation not being operated in the desired manner. Discrepancies between nominal configuration parameters and actual configuration parameters can occur, for example, as a result of configuration parameters being entered incorrectly in the installation control system, as a result of software errors in the installation control system, as a result of which configuration parameters are inadvertently changed, or occur as a result of self-adjustment of the installation control system.

The term "wind energy installation" represents an installation in which electrical power is generated from the wind. In this case, a rotor which is fitted to a pod, which is located on a mast, is generally caused to rotate by the wind. The rotor drives a generator, which converts the mechanical energy to electrical energy. The electrical energy is adapted with the aid of a converter and/or a transformer such that it can be fed into an electrical grid. The individual components of the wind energy installation are in this case controlled by an installation control system.

In conjunction with wind energy installations, so-called "grid stations" and "meteo stations" are also frequently used. When a plurality of wind energy installations are combined in a wind farm, it is normal practice to connect the wind energy installations to an electrical grid within the wind farm and to connect this grid within the wind farm via a transformer to the general electricity grid, the so-called feed point. The requirements of the operator of the general electricity grid, relating to voltage, frequency and phase angle of the power fed in, must be complied with at the wind farm feed point in the general electricity grid. For this purpose, the grid station measures the relevant electrical variables at the feed point, receives preset values from the operator of the public electricity grid, and transmits nominal values to the individual wind energy installations. It is also possible to provide a meteorological measurement station (so-called "meteo station") which measures weather information, in particular the wind direction and wind strength, thus making it possible to determine from these variables availability values, power curves and power output to be expected for all the wind energy installations in the wind farm. Both in the case of grid stations and meteo stations, installation control systems are generally provided whose method of operation can be adapted by configuration parameters, and which are accordingly suitable for use of the methods according to the invention.

The term "server" denotes a functional unit which may also comprise a plurality of physical computer units. For example, a comparison of actual with nominal configuration parameters and/or the output of discrepancies can be carried out to a server unit which is separate from the computer unit provided for communication with the installation control system.

In addition, the installation control system for the wind energy installation can be split between a plurality of components, for example a main control unit, a pitch controller and/or a converter control unit. The characteristics of the individual components of the installation control system can then likewise be mapped in the form of configuration parameters in a configuration parameter set.

Since the invention provides that the comparison of the actual configuration parameter set with the nominal configuration parameter set is no longer carried out manually, this avoids one potential error source, and reduces the risk of the wind energy installation being operated with incorrect and therefore non-optimum configuration parameters. Since the configuration parameter monitoring is also carried out automatically and therefore does not require any working time by expensive specialists, the configuration parameter monitoring can be carried out cost-effectively, and in particular at shorter time intervals. The intervals can be planned better and are complied with better, because of automation. The operational reliability and, not least, also the yield can thus be consistently optimized. In addition, this avoids quick identification as to whether the wind energy installation is being operated with configuration parameters which are undesirable for the respective wind energy installation with its environmental conditions.

In a first step, the nominal configuration parameters are generated. In doing so, it is possible to recreate the nominal configuration parameters for each wind energy installation. However, it is also possible for nominal configuration parameters of a first wind energy installation to be copied to the nominal configuration parameters of a second, physically identical wind energy installation, or for a configuration parameter set template to be stored for each variant that exists of the wind energy installation, and from which the appropriate parameter set is selected.

It is preferable for the nominal configuration parameters to be obtained from default parameters for the wind energy installation, component parameters for components installed in the wind energy installation, and option parameters for options which are provided in the wind energy installation. Default parameters are those configuration parameters which are typical of one type of wind energy installation, for example the rotor diameter, the tower height or the grid frequency (50 or 60 Hz). However, components from different manufacturers or suppliers can be used within one type, and may require different settings. This can be represented by the component parameters. In the end, it is also possible for the wind energy installation to have additional or alternative options. Options generally relate to special configurations of the installation control system which are used, for example, to match the wind energy installation to the local requirements of the public grid operator or, for example, to comply with requirements relating to noise emission. Options can be implemented by means of software in the installation control system and/or can be used to define the desired operating response. By way of examples, options make it possible for the installation control system to optimize the operation of the wind energy installation for minimum acoustic emissions rather than with respect to the maximum efficiency of the wind energy installation, by avoiding operating points which are particularly noisy. Options can be included in the installation control system simply by taking them into account during the generation of the configuration parameters for the individual components of the wind energy installation. However, it is also possible for separate option parameters to be recorded in the configuration parameter set, which are then taken into account by the installation control system during operation, or for the option parameters to activate specific functions in the installation control system, which are normally not activated.

By way of example, the nominal configuration parameter set can be generated by means of software, in which case the installed components and the options are stated in the software of the installation type, and a set of nominal configuration parameters is then generated, based on the default, component and option parameters.

Even the automated generation of a nominal configuration parameter set, which is the subject matter of the other independent method claim, avoids potential incompatibilities such as those which can occur during manual creation of the nominal configuration parameter set according to the prior art. It is therefore possible to reliably avoid configuration parameter sets and critical operating states occurring as a result which, for example, lead to undesirable resonant oscillations in the tower of the wind energy installation.

The generated nominal configuration parameter set is stored in a database. The database can be arranged in the installation control system or in a server. This server can in turn be arranged on the wind energy installation itself or at a point remote from it. In the latter case, it is preferable for the communication between the wind energy installation and the server to take place via the Internet, as a result of which it is possible to exchange configuration parameters between the server and the installation control system or a further component of the wind energy installation, for example a communication unit. The installation control system or the communication unit is able to combine configuration parameters currently used by the installation control system to form an actual configuration parameter set. The comparison between the actual and the nominal configuration parameter set can be carried out by the installation control system, the server or an additional comparison component, which is designed for this purpose. It is preferable for the comparison to be carried out in the server. For the comparison, each individual configuration parameter from the actual configuration parameter set can be compared with the corresponding value in the nominal configuration parameter set. However, it is also feasible to use other methods, for example statistical methods.

It is possible for the server to be a central server, which stores the nominal configuration parameter sets for a plurality of wind energy installations.

The comparison of the actual configuration parameter set with the nominal configuration parameter set can be carried out at fixed intervals. It is also possible for the comparison between the nominal and the actual configuration parameters to be carried out on request, for example on request by the server and/or the installation control system. Furthermore, it is also possible for the comparison to be carried out when predetermined events occur, in particular when the actual configuration parameter set changes, the installation is started up for the first time, maintenance has been carried out on the installation, and/or the installation control system software has been updated.

If a discrepancy is found between the actual and the nominal configuration parameter set, a warning message is output. The warning message can be output on an output unit which is connected to the server or to the installation control system, for example a printer or a screen. However, it is also possible, when a discrepancy is found, for an appropriate message to be sent, in which case the message can be sent, for example, by e-mail or by some other network-supported message service. It is also possible to enter the discrepancy in a list which, for example, can be viewed via the Internet.

It is possible for the comparison of the nominal configuration parameter set with the actual configuration parameter set to be carried out at times with a discrepant nominal configuration parameter set, and/or to suppress the output of discrepancies. A nominal configuration parameter set which is changed at times may be necessary when a component of the wind energy installation has been damaged or has failed. It is possible to continue to operate the wind energy installation until the affected component is replaced, in general with the actual configuration parameter set being changed. Since the nominal configuration parameter set on which the comparison according to the invention is based is changed at times, it is possible to still operate the wind energy installation without a warning message being produced regularly. Alternatively, the output of warning messages for the relevant wind energy installation can be suppressed. When a discrepancy is found between the actual and the nominal configuration parameter set, the wind energy installation can also be restricted or shut down, in particular when the discrepancies are found in critical configuration parameters.

It is likewise possible to vary the nominal configuration parameter set over the life of the wind energy installation. This makes it possible to take account on the one hand of new knowledge gained during operation of wind energy installations, and on the other hand to take account of aging of components of the wind energy installation.

It is preferable for the nominal configuration parameter set, the actual configuration parameter set and/or the discrepancy between the nominal and the actual configuration parameter set to be archived over the life of the wind energy installation. The archived data can then be evaluated statistically in order to gain new knowledge relating to optimum operation of a wind energy installation.

The arrangement according to the invention for automatic configuration parameter monitoring for wind energy installations is designed to carry out the method according to the invention. Reference is therefore made to the above explanations.

BRIEF DESCRIPTION OF THE DRAWING

The invention will now be described, by way of example, on the basis of one advantageous embodiment and with reference to the attached drawing, in which:

FIG. 1 shows a schematic illustration of an arrangement according to the invention for automatic parameter monitoring for wind energy installations.

DETAILED DESCRIPTION OF THE INVENTION

In order to convert wind energy to electrical energy, the wind energy installation 10 has a rotor 13, which drives a generator 14 and is attached to a pod 12 which is mounted so as to rotate on a tower 11. The electrical power produced by the generator 14 is at least partially converted via a converter 15 and a transformer 16 such that it can be fed into a high-voltage or medium-voltage grid 17. The conversion is carried out such that the voltage amplitude, frequency and phase shift of the electric power comply with the requirements of the high-voltage or medium-voltage grid 17.

The wind energy installation 10 is controlled by an installation control system 20 which is connected to individual components of the wind energy installation via control lines which are not illustrated. The installation control system 20 can therefore act on the components of the wind energy installation 10 in such a way that the wind energy installation 10 is operated at a desired operating point. The operating point can be chosen, for example, for the highest possible energy efficiency, for the lowest possible noise emissions or in general in order to remain within a rotation-speed/torque range which is dependent on the wind speed. The installation control system 20 controls the wind energy installation 10 on the basis of configuration parameters which can be combined in a configuration parameter set.

The installation control system 20 has a communication unit 21 which is connected to the Internet 22. The installation control system 20 or the communication unit 21 is able to combine the configuration parameters currently used by the installation control system 20 to form an actual configuration parameter set, and to send this via the Internet 22.

A server 23 is likewise connected to the Internet 22 and can receive the actual configuration parameter set for the wind energy installation 10. Alternatively, it is possible for the server 23 to be arranged at the wind energy installation 10 and to be directly connected to the installation control system 20 or to the communication unit 21.

When a wind energy installation 10 is being installed, a configuration parameter set must be entered in its installation control system 20, on the basis of which the wind energy installation 10 will be controlled after commissioning.

For this purpose, various information is entered in the server 23 relating to the wind energy installation 10. Inter alia, this information includes first code value blocks 30 relating to the type of wind energy installation 10, for example comprising information relating to the diameter of the rotor 13 or the height of the tower 11. In addition, second code value blocks 31 are entered in the server 23, relating to the components installed in the wind energy installation 10, such as the generator 14, the converter 15 or the transformer 16. In the end it is also possible to make third code value blocks 32 available to the server 23, relating to desirable options for the wind energy installation 10. For example, an option can be selected on the basis of which the wind energy installation 10 is controlled such that noise-critical operating ranges are avoided and/or specific noise levels are not exceeded. It is also possible to select an option, on the basis of which the wind energy installation 10 feeds the electrical power into the high-voltage or medium-voltage grid with a predeterminable phase angle.

The server 23 then obtains various stored parameters from a database 24 associated with the server, which parameters correspond to the configuration of the wind energy installation 10, resulting from the code value blocks 30-32. These individual parameters are then combined to form a nominal configuration parameter set. It is possible to vary the individual parameters from the database within a predetermined range when they are being combined to form the nominal configuration parameter set. The nominal configuration parameter set generated in this way is stored in a second database 25, associated with the server 23.

In addition, the nominal configuration parameter set is printed out. A servicing technician can enter the nominal configuration parameter set in the installation control system 20 with the aid of the print-out 33. The installation control system 20 will then operate the wind energy installation 10 on the basis of the entered configuration parameter set.

The server 23 sends a request at regular intervals to the installation control system 20, or to its communication unit 21. In response to this, the configuration parameters currently being used by the installation control system 20 are combined to form an actual configuration parameter set, which is sent to the server 23 via the communication unit 21 and the Internet 22.

As soon as the server 23 receives the actual configuration parameter set from the wind energy installation 10, it loads the nominal configuration parameter set relating to the wind energy installation 10 from the database 25, and compares the actual configuration parameter set with the nominal configuration parameter set.

If the server 23 finds any discrepancies between the actual and the nominal configuration parameter sets, a warning message is output. Discrepancies can occur, for example, when the servicing technician has made an error when entering the configuration parameters in the installation control system, or the installation control system has adjusted itself and the configuration parameters have changed because of special events, for example failure of a component, or faulty programming. If parameters which differ from the nominal configuration parameters are used to control the wind energy installation 10, this can lead to damage to the wind energy installation 10. At the least, however, the wind energy installation 10 will no longer be operated at the desired operating point.

The warning message is output in the form of an e-mail via the Internet 22. A servicing technician can call up the warning message from a terminal 26 connected to the Internet 22, and can address the problem.

The invention claimed is:

1. A method for automatic configuration parameter monitoring for wind energy installations, comprising:
    generating a nominal configuration parameter set for a wind energy installation;
    storing the nominal configuration parameter set in a database;
    automatically detecting an actual configuration parameter set for the wind energy installation;
    automatically comparing the nominal configuration parameter set with the actual configuration parameter set;
    outputting a warning message in the event of discrepancies between the actual configuration parameter set and the nominal configuration parameter set,
    wherein the configuration parameter sets comprise configuration parameters describing equipment of the wind energy installation in coded form; and wherein the nominal configuration parameter set is obtained from default parameters for the wind energy installation, component parameters for components installed in the wind energy installation, and option parameters for options provided in the wind energy installation.

2. The method of claim 1, wherein the database is associated with a server and the actual configuration parameter set for the wind energy installation is obtained by an installation control system or a communication unit.

3. The method of claim 1, wherein the comparison between the actual and the nominal configuration parameter set is carried out by an installation control system, a server, or an additional comparison component designed for this purpose.

4. The method of claim 2, wherein communication between the installation control system for the wind energy installation and the server takes place via the Internet.

5. The method of claim 1, wherein the comparison of the nominal parameter set with the actual parameter set is carried out at a fixed interval, after predetermined events, or both.

6. The method of claim 1, wherein the comparison of the actual configuration parameter set with the nominal configuration parameter set is carried out on request.

7. The method of claim 1, wherein the comparison of the nominal configuration parameter set with the actual configuration parameter set is carried out at times using a discrepant nominal configuration parameter set, the output of the warning message is suppressed, or both.

8. The method of claim 1, wherein the nominal configuration parameter set is varied over the life of the wind energy installation.

9. The method of claim 1, wherein at least one of the nominal configuration parameter set, the actual configuration parameter set, and the discrepancies between the actual configuration parameter set and the nominal configuration parameter set are archived over the life of the wind energy installation.

10. A method for generating a nominal configuration parameter set for an installation control system for a wind energy installation, comprising:
   checking a type of the wind energy installation, components installed in the wind energy installation, and options that are provided;
   automatically obtaining default parameters for the type of wind energy installation, component parameters for the components installed in the wind energy installation, and option parameters for the options provided in the wind energy installation from a database;
   automatically combining the default parameters, component parameters, and option parameters to form a nominal configuration parameter set,
   wherein the configuration parameter set comprises configuration parameters describing equipment of the wind energy installations in coded form; and, wherein, when the default parameters, component parameters and option parameters are being combined to form a nominal configuration parameter set, the parameters are individually varied in a predetermined range.

11. A system for automatic configuration parameter monitoring for wind energy installations, comprising:
   a server;
   at least one wind energy installation having a communication unit configured to obtain actual configuration parameters for the wind energy installation as an actual configuration parameter set; and
   a database associated with the server and configured to store a nominal configuration parameter set for the at least one wind energy installation;
   wherein at least one of the server, the communication unit, and an installation control system of the at least one wind energy installation is configured to automatically detecting an actual configuration parameter set for the wind energy installation, to automatically compare the actual configuration parameter set with the nominal configuration parameter set and to output a warning message in the event of discrepancies between the actual configuration parameter set and the nominal configuration parameter set, and
   wherein the configuration parameter sets comprise configuration parameters describing equipment of the at least one wind energy installations in coded form; and
   wherein the server is associated with a second database comprising at least one of default parameters for the at least one wind energy installation, component parameters for components installed in the wind energy installation, and option parameters for options provided in the wind energy installation, and the server is configured to generate the nominal configuration parameter set from at least one of the default parameters, the component parameters, and the option parameters.

12. The method of claim 2, wherein the server is a central server.

* * * * *